United States Patent [19]

Dunagan

[11] 3,755,838

[45] Sept. 4, 1973

[54] INTEGRATED BOAT-TRAILER-CAMPER APPARATUS

[76] Inventor: Lawrence G. Dunagan, 205 Height Blvd., Houston, Tex. 77007

[22] Filed: Apr. 30, 1971

[21] Appl. No.: 138,945

[52] U.S. Cl. .................................................. 9/1 T
[51] Int. Cl. ............................................. B63c 13/00
[58] Field of Search ................. 9/1 T, 1 R; 115/1 A, 115/1 R; 280/414 A, 414 R, 491 B, 491 D, 464, 466–469, 490 R

[56] References Cited
UNITED STATES PATENTS

| | | | |
|---|---|---|---|
| 2,784,424 | 3/1957 | Southerland | 9/1 T |
| 3,618,149 | 11/1971 | Christensen | 9/1 T |
| 3,300,796 | 1/1967 | Powers | 9/1 T |
| 2,535,927 | 12/1950 | Hyler | 280/468 |
| 2,781,529 | 2/1957 | Moody | 9/1 T |
| 2,549,734 | 4/1951 | White | 280/490 R X |

FOREIGN PATENTS OR APPLICATIONS

| | | | |
|---|---|---|---|
| 649,243 | 1/1951 | Great Britain | 9/1 T |
| 1,344,207 | 10/1963 | France | 9/1 T |

*Primary Examiner*—Milton Buchler
*Assistant Examiner*—Stuart M. Goldstein
*Attorney*—Pravel, Wilson & Matthews

[57] ABSTRACT

A new and improved integrated boat-trailer-camper apparatus, movable on land and on water, with longer service life, easier entry into and removal from the water, improved handling and maneuverability while in the water, and improved means for support when used on land.

8 Claims, 5 Drawing Figures

Lawrence G. Dunagan
INVENTOR

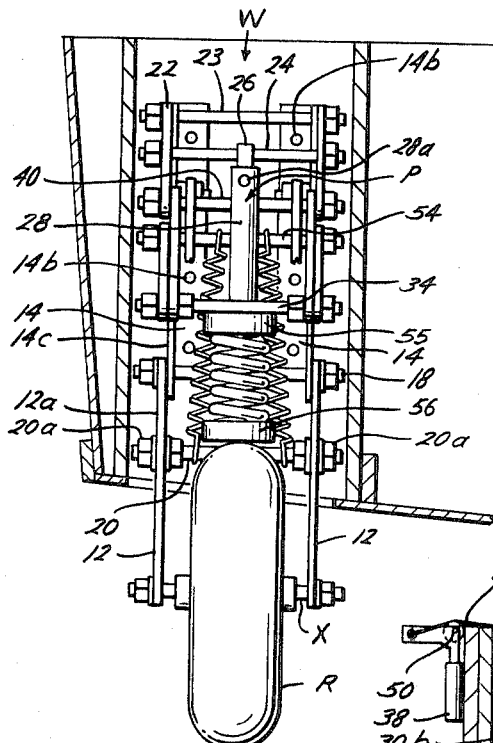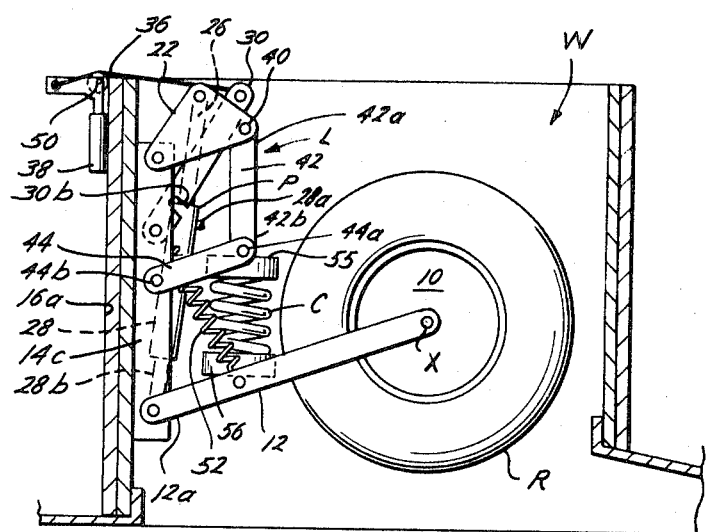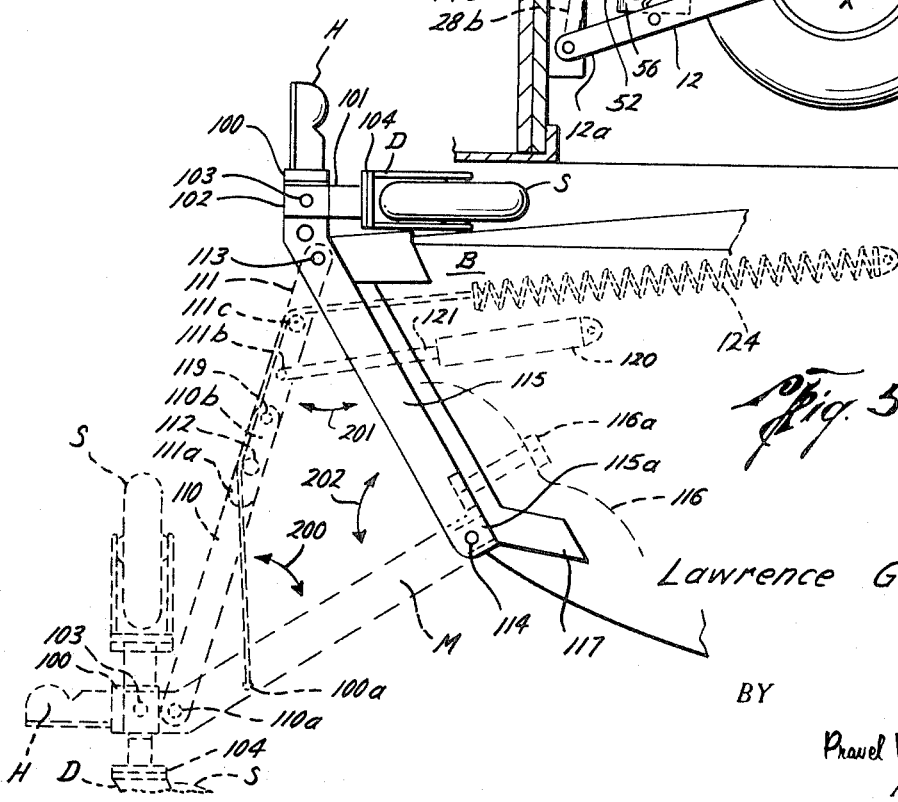

INTEGRATED BOAT-TRAILER-CAMPER APPARATUS

BACKGROUND OF THE INVENTION

1. Field of the Invention

The present invention relates to integrated boat-trailer-camper apparatus movable on land and on water.

2. Description of the Prior Art

The prior art boat-trailer apparatus, such as that of U.S. Pat. Nos. 3,158,881; 3,055,023; 3,530,519; 3,090,973; 2,954,569; 3,085,261; 3,537,117; 3,436,773; 3,135,975; 3,414,917; and 2,893,019; suffered several shortcomings.

The retractable wheels, attachment gear, and support structure of certain of the prior art apparatus were immersed in water when the boat was in the water, causing rust and undue wear of such structure, and hampering the handling and maneuverability of the apparatus in the water. The wheels and support structure of other prior art apparatus were stored in the interior of the boat-trailer apparatus when the boat was in the water, taking up needed passenger and cargo space and causing a risk of passengers stumbling or tripping over such structure. Other prior art structure was bulky, cumbersome, and expensive to manufacture.

Further, manually-operated gear was used to raise and lower the retractable wheels when moving the apparatus into and out of the water, making the operation tedious and tiresome and often requiring one of the passengers to enter the water to adjust the retractable wheels.

SUMMARY OF THE INVENTION

Briefly, the present invention provides a new and improved integrated boat-trailer apparatus movable on land and water wherein the apparatus is supported on retractable wheels extended to support the apparatus when on land, and the apparatus floats when in the water. The retractable wheels are moved to and from the extended postion by a piston permitting rapid and easy movement of the apparatus into and out of the water. A pivoted support wheel is pivoted to and from a position supporting the apparatus when on land. The support wheel is mounted with the exterior of the apparatus above the water line when the apparatus is in water making available space which was required for storage of the support wheel in the prior art.

It is an object of the present invention to provide a new and improved integrated boat-trailer apparatus.

It is an object of the present invention to provide a new and improved integrated boat-trailer apparatus with rapid and easy entry into and removal from a body of water.

It is an object of the present invention to provide a new and improved support attachement for an integrated boat-trailer apparatus.

Brief Description of the Drawings

FIG. 3 is a rear view of the wheel of FIG. 2;

FIG. 4 is an elevation view of the wheel of FIG. 2 with the parts thereof in a different position; and FIG. 5 is an elevation view of the support attachment of the present invention.

DESCRIPTION OF PREFERRED EMBODIMENT

Figure 1:
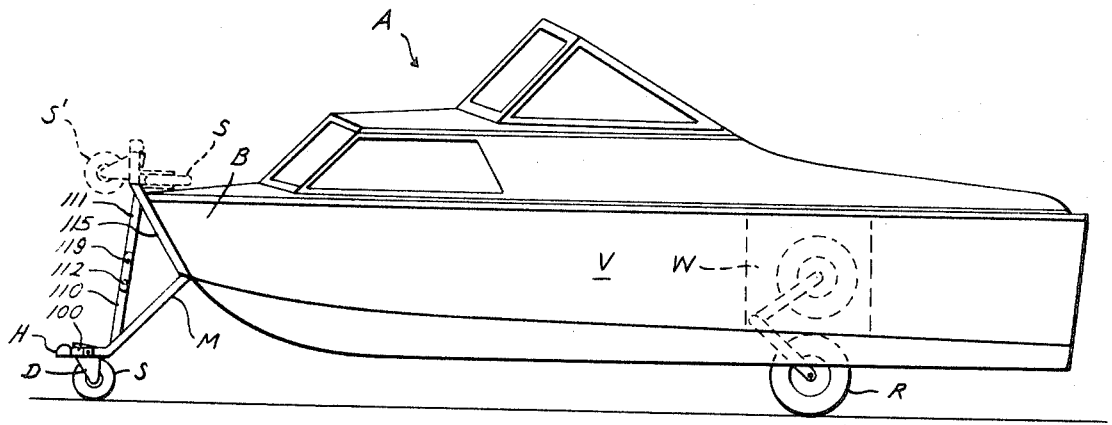
FIG. 1 is an elevation view of the apparatus of the present invention.

In the drawings, the letter A designates generally the apparatus of the present invention, an integrated boat-trailer-camper movable on land and on water, comprising a vessel V which may be an inboard or outboard powered vessel, boat, or other means for marine transportation and movement. The vessel V is mounted with retractable wheels R movable to and from extended positions (FIG. 1) to support the apparatus A when such apparatus is moving or stored on land. The retractable wheels R are moved to and from the extended position and a retracted position (shown in phantom in FIG. 1) by a piston P (FIG. 2 and FIG. 4).

A receiving wheel well W (FIGS. 1-4) is formed in the vessel V for each of the retractable wheels R to store same when the retractable wheels R are retracted from the extended position to the retracted position (FIG. 4) in order that the handling and maneuverability of the vessel V is not hindered or impaired when the vessel V is moving in the water.

A front support wheel S (FIGS. 1 and 5) mounted with a support arm M is pivotably movable to and from an extended position supporting the apparatus A on land (FIG. 1) and a secured position (shown in phantom in FIG. 1) and secured to a prow or bow B of the vessel V when the apparatus A is moving or floating in the water.

Figure 2:
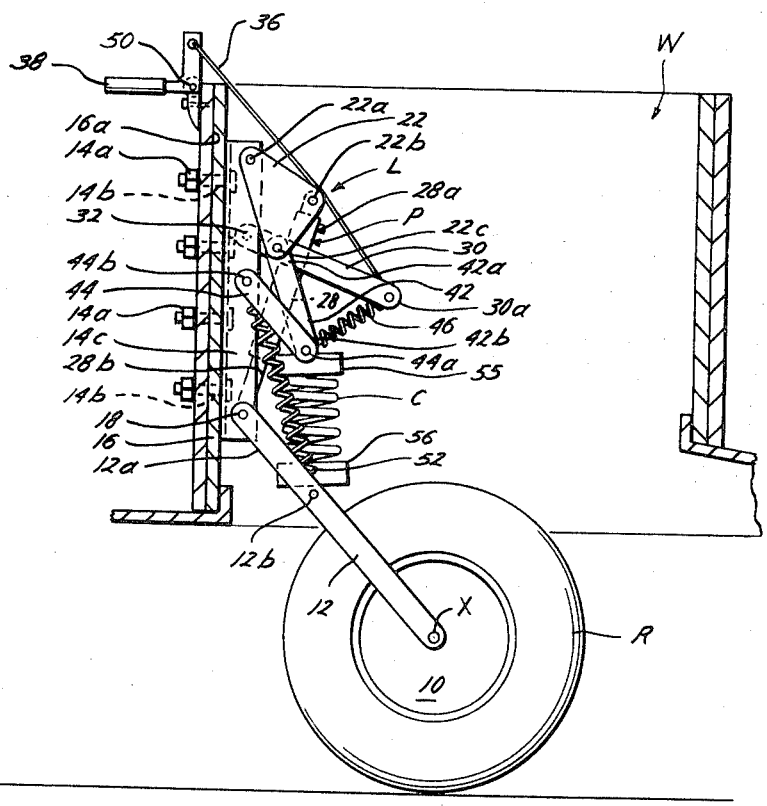
FIG. 2 is an elevation view of a retractable wheels of the apparatus of the present invention.

Each of the retractable wheels R is mounted on a wheel rim 10 and rotatably movable with respect to an axle X (FIGS. 2-4). The axle X is mounted with a plurality of movable support arms 12 which are mounted in the wheel well W in a manner to be more evident hereinbelow to permit movement of the retractable wheel R to and from the extended position (FIG. 2) and the retracted position (FIG.4). It should be understood that in the embodiment set forth herein, two wheel wells W are formed in the underside of the vessel V to support the apparatus A when such apparatus is on land. However, for larger vessels and apparatus, it should be understood that more than two retractable wheels may be used to support the vessel, and a like number of wheel wells W would be formed and the underside of the vessel V for receiving such retractable wheels when the wheels are in the retracted position.

Each of the wheel support arms 12 is mounted at an upper end 12a (FIG. 2 and FIG. 4) with an angle iron mounting bracket member 14 which is secured to a front wall 16 of the wheel well W (FIG. 2) by a plurality of bolts 14a or other suitable mounting means passing through apertures 14b (FIGS. 2 and 3) formed in the angle iron members 14. A pin or rod 18 passes through an aperture formed in the upper end 12a of the movable wheel support arm 12 and a similar aperture formed in the outwardlyextending portion 14c of the angle iron member 14 to mount the support arm 12 with the angle iron member 14. The pin 18 permits rotational movement of the movable support arm 12 by the piston P to move the retractable wheel R from the extended position (FIG. 2) to the retracted position (FIG. 4), as will be more evident hereinbelow.

A linkage arrangement L (FIGS. 2-4) is mounted with each of the angle iron members 14 mounted on the wheel well W to move the retractable wheel R from the extended position (FIG. 2) to the retracted position (FIG. 4) under control of the pistn P. Each of the linkage arrangments L includes a pivot member or plate 22 mounted at a pivot point 22a with the outwardly-extending flange 14c of the angle iron member 14 and supported by an axle or rod 23 extending between the flanges 14c of the two angle iron members 14 mounted in the wheel well W (FIG. 3). A rod 24 extends between an aperture 22b formed in each of the pivot members 22 (FIG. 2) and is secured to each of such pivot members 22 by a bolt or other suitable means. A piston rod 26 of piston P (FIG. 3) has an aperture formed therein through which the rod 24 passes in order that upward movement of the piston arm 26 due to movement of the piston P within a cylinder 28 housing such piston P causes rotational movement of the pivot plate 22 about the mounting 22a of the pivot plate 22 with the angle iron members 14.

An inlet conduit 28a permits passage of air, gas, or fluid through a suitable conduit from a pump, which may be electrically, mechanically, hydraulically, or manually driven to permit such fluid to cause movement of the piston P to move the retractable wheel R from the extended position to the retracted position, as will be more evident hereinbelow. Piston P and the cylinder 28 are moutned between the pin 24 and the pin 18 by the piston rod 26 and a lower mounting arm 28b (FIG. 2).

A first pivot arm 30 of each of the linkage arrangements L (FIG. 2) is moutned with the outwardly-extending flange 14c of the angle iron member 14 and connected with the opposite first pivot arm 30 (FIG. 3) by a common support rod or axle 32.

A support arm 34 is mounted between an outer end 30a of each of the pivot arms 30 by bolts or other suitable means and has mounted therewith a control cable 36 (FIG. 2) which moves under the control of a control lever 38 to lock and unlock the retractable wheels R in the extended position. A notch formed adjacent a surface 30b (FIG. 4) in the pivot arm 30 receives a pin 40 to form a safety latch and lock the retractable wheel R in the extended position (FIG. 2) to prevent inadvertent release or collapse of the retractable wheel R when the apparatus A is on land. The pin 40 extends through an aperture 22c (FIG. 2) formed in the pivot member 22 and an upper end 42a of a second pivot arm 42 in order that the pivot member 22 and the second pivot arm 42 are pivotably movable with respect to each other during the extension and retraction of the retractable wheel R.

A lower end 42b of the second pivot arm 42 of the linkage arrangement L is pivotally mounted with respect to a lower end 44a of a third pivot arm 44 of the linkage arrangement L and pivotally movable with respect thereto. An upper end 44b of the third pivot arm 44 is pivotally mounted with respect to the outwardly-extending flange 14c of the angle iron member 14 mounted with the wheel well W. A tension spring 46 (FIG. 2) is mounted between the end 30a of the first pivot arm 30 and the connection between the end 42b of the second pivot arm 42 and the end 44a of the third pivot arm 44a. The spring 46 provides a force urging the axle 40 firmly into engagement with the notch formed adjacent the surface 30b of the pivot arm 30 to retain the safety latch in an engaged position. The tension force in the spring 46 is removed by movement of the control lever 38 downwardly about a pivoting connection with the mounting attachment 50 mounted to an inner surface 16a of the front of the wheel well W (FIG. 2). When the retractable wheel R is in the retracted postion (FIG. 4) the spring 46 is behind the second pivot arm 42 and is not seen in the view illustrated in FIG. 4.

A second tension spring 52 (FIGS. 2–4) is mounted with the axle 20 at a lower end thereof and with the pin 54 (FIG. 3) extending between the upper end 44b of the third pivot arm 44. The spring 52 is extended to an elongated length when the retractable wheel R is in the extended position (FIG. 2), and exerts a force pulling the axle 20 upwardly when the safety latch formed by the axle 40 and the notch in the first pivot arm 30 is released to cause rotational movement of the support arm 12 in a counterclockwise direction from a position holding the retractable wheel R in the extended position (FIG. 2) to the retracted position in the wheel well W formed in the underside of the vessel V.

A coil spring C is mounted between an upper coil spring cup 55 and a lower coil spring cup 56 (FIGS. 2–4) to provide resilient support for the retractable wheel R when the apparatus A is moving on the land to insure a smooth ride and reduce the shock to the apparatus A and its contents when the apparatus is on the land. The upper spring cup 55 is mounted with the axle 34 extending between the connection of the lower end 42b of the second pivot arm 42 and the lower end 44a of the third pivot arm 44. The lower coil spring cup 56 is mounted with the axle 20 (FIG. 3) extending between the support arm 12. It should be noted that the coil spring C in exerting a force against the upper spring cup 55 and the lower spring cup 56 urges the second pivot arm 42 upwardly firmly into the safety latch formed by the notch in the pivot arm 30 and the axle 44 to further retain the retractable wheel R in the extended position when the apparatus A is on land.

The front support wheel S (FIGS. 1 and 5) is mounted with the prow or bow B of the apparatus A and supports the front of the apparatus A when such apparatus is on land without requiring additional support blocks or brick, while permitting movement of the apparatus A without requiring that the prow B of the apparatus A be lifted by users when moving the apparatus A on land, thus permitting ease of movement and storage of the apparatus A on land.

A trailer hitch H with a receiving socket of the conventional type is formed at an outer end 100 of the support arm M to connect the apparatus A to a car, truck, tractor, or other suitable transportation means to move the apparatus A on land.

The support wheel S is mounted with a dolly D (FIGS. 1 and 5) and rotatably movable with respect to the dolly D. The dolly D is mounted with a connecting arm 101 to a sleeve 102. The sleeve 102 encloses the lower end 100 of the support arm M adjacent the trailer hitch H and is rotatably movable with respect to the support arm M permitting 360° rotational movement of the front support wheel S and the dolly D with respect to the support arm M for reasons to be more evident hereinbelow. A socket 103 is formed in the sleeve 102 to permit passage therethrough of a locking pin or other suitable means to lock the dolly D and the front support wheel S in a position supporting the apparatus A on land (FIG. 1 and in phantom in FIG. 5). The pin is removed from the socket 103 to permit the rotational movement of the dolly D and the front support wheel S with respect to the support arm M. A ball-bearing arrangement 104 is mounted between the dolly D and the support arm 101 to permit rotational movement of the dolly D and the front support wheel S with respect to the sleeve 103 in order that the front support wheel S may be rotated to lie flat (FIG. 5) with respect to the prow B of the vessel V when the apparatus A is in the water in order to reduce exposure of the support wheel S and the dolly D to the spray from the water.

A lower pivot arm 110 is pivotally mounted at a lower end 110a with the support arm M. The lower support arm 110 is pivotally mounted at an upper end 110b with a lower end 111a of an upper pivot arm 111 by a pin 112. The upper pivot arm 111 is pivotally mounted at an upper end 111b with a pin 113. The support arm M is pivotally mounted by a pin 114 with a lower end 115a of the pivot arm receiving channel member 115.

The channel member 115 is U shaped in horizontal cross-section and is mounted to a support attachement 116 within the prow B of the vessel by a bolt 116a extending through the support attachement 116 and the connecting portion of the U-shaped channel member 115. The channel member 115 is mounted with an exterior support attachement 117 secured to the prow B of the vessel V by bolts, screws, or other suitable means.

A piston 120, of like construction and function to the piston P previously set forth, is mounted within the prow B of the vessel, and a piston rod 121 thereof extends outwardly through the channel member 115 and is mounted with upper support arm 111 at a connection 111b. Introduction or removal of fluid from the piston 120 causes outward or inward motion, respectively of the piston arm 121 causing the upper pivot arm 111 to move as indicated by the arrow 201 (FIG. 5). Movement of the upper pivot arm 111 causes movement of the lower pivot arm 110 about their pivoting connection 112 as indicated by the arrow 200 (FIG. 5). The pivot arms 110 and 111 move as indicated by the arrows 200 and 201, such pivot arms jack-knife with respect to each other and fold together and are received within the channel member 115 as the piston rod 121 draws the upper support arm 111 inwardly to move the support wheel S from a position supporting the apparatus A.

Inward movement of the pivot arms 110 and 111 causes clockwise rotational movement of the support arm M with respect to the pin 114 mounting such support arm with the channel member 115, as indicated by the arrow 202 (FIG. 5). Thus, removal of the fluid from the cylinder in the piston 120 permits inward movement of the pivot arms 110 and 111 and the support arm M with respect to the prow B of the vessel V moving the support wheel S from a position supporting the apparatus A with respect to the ground (FIG. 1 and phantom in FIG. 5) to a retracted position within the channel member 115 in order that the support wheel S does not interfere with movement and handling of the apparatus A in the water. As has been previously set forth, the support wheel S may be moved to a position flat with the prow B of the vessel V (FIG. 5) from a forwardly-extending position (shown as S' in FIG. 1) in order to protect the support wheel S and dolly D from spray.

For ease of inward movement of the support arm M and the pivot arms 110 and 111 and to firmly hold same in place with the prow of the vessel V in the retracted position, a spring 124 is mounted within the interior of the vessel V. An end of the spring 124 extends through an aperture formed in the channel member 115 over a support pin 111c in the upper pivot arm 111 and the pin 112 pivotally connecting the support arms 110 and 111 to a connection 100a (FIG. 5) with the support arm M. The spring 124 exerts a force drawing the support arm M upwardly and the pivot arms 110 and 111 inwardly to move the support arm M and pivot arms 110 and 111 into the channel member 115 when the support wheel is being moved from a position supporting the apparatus A on land (FIG. 1) to the retracted position (FIG. 5).

A locking pin 119 (FIGS. 1 and 5) is inserted through sockets formed in the upper end 110b of the lower pivot arm 110 and the lower end 111a of the upper pivot arm 111 to lock the pivot arms 110 and 111 in place and prevent the spring 124 from moving the support arm M upwardly when it is desired to store the apparatus A on land. The locking pin 119 overcomes the force of the spring 124 and retains the support arm M, the pivot arm 110 and the pivot arm 111 locked in position supporting the apparatus A on land.

In the operation of the present invention, the apparatus A is supported and stored on land with the retractable wheels R in the extended position (FIGS. 1 and 2) and the support wheel S extended in a position supporting the apparatus A when the apparatus A is stored on land. When it is desired to move the apparatus A to water for use, the transporting vehicle is connected to the apparatus A at the trailer hitch A. The pin is removed from the socket 103 and the support wheel S is pivoted upwardly out of contact with the ground (shown in phantom in FIG. 5) and the pin again inserted in the socket 103 to lock the support wheel S in such position. The apparauts A is then towed or moved to the water. With the retractable wheels R of the present invention, it is not necessary that a concrete landing ramp be used to move the apparatus A into the water. The retractable wheels R will support the apparatus A while the apparatus is being moved into the water on a sandy beach or the like if desired. After the vessel V and the apparatus A are backed into the water, the towing vehicle is detached from the trailer hitch H.

The control lever 38 is then moved downwardly (FIG. 4) moving the axle 40 out of engagement in the notch formed adjacent the surface 30b of the pivot arm 30, releasing the safety latch which held the retractable wheel R in the extended position (FIG. 2). The pump is then activated to introduce fluid through the inlet conduit 28a to the cylinder 28 of the piston P forcing the piston rod 26 upwardly, causing the pivot plate 22 to rotate counterclockwise from the position of FIG. 2 to the position of FIG. 4. The movement of the pivot plate 22 causes the first pivot arm 30 to move counterclockwise and the pivot arm 42 to move clockwise, while the pivot arm 44 moves counterlcockwise. Movement of the three pivot arms in these directions previously set forth draws the wheel support arms 12 upwardly, moving the retractable wheel R from the extended position to a retracted position above the water line in the wheel well W (FIG. 4). The retractable wheel R, the axle X, the coil spring C, the piston P, and the linkage arrangement L of the apparatus A are above the water line in the wheel well W when the apparatus A is in the water, preventing extended exposure and contact of such structure with the water when the apparatus A of the present invention is in the water, extending the service life of such retractable wheel and associated structure.

The locking pin 119 is next removed from the connection between the pivot arms 110 and 111, and the fluid is removed from the piston 120 permitting the spring 124 and the piston arm 121 to move the pivot arms 110 and 111 and the support arm M inwardly within the channel member 115. The support arm M is then retained within the channel member 115 and support attachement 117 by the spring 124 as has been previously set forth, and the support wheel S is moved to a position flat with the prow B (FIG. 5) of the vessel V.

It should be noted with the pistons P and 120 of the apparatus A of the present invention, the user and passengers of the apparatus A do minimum work when moving the apparatus into the out of the water, therefore the apparatus A can be loaded into and out of the water at a shore or other place, and it is not necessary that one of the passengers enter the water to move the wheels into and out of the water during such transition.

It should further be noted that with the piston P of the present invention, the retractable wheels R are held in the retracted position (FIG. 4) when the piston P is energized, and held in the extended position by the safety latch previously set forth, when the piston P does not receive fluid. With this arrangement of the piston P, in the event of a failure or leak in the piston P while the apparatus A is being stored on the land or being moved on the land, the retractable wheel R is retained in the extended position supporting the apparatus A in the event of such failure and preventing damage or harm to the apparatus A.

It should further be noted that the retractable wheels R and support wheel S of the present invention might also be used, if desired, to support boat trailers or other types of vehicle-towed trailers and apparatus.

Further, it should be understood that the retractable wheels R may have disk or drum brakes and associated brake control structure mounted therewith in order to provide safe and sure stopping of the apparatus A when moving same on land and the like.

The foregoing disclosure and description of the invention are illustrative and explanatory thereof, and various changes in the size, shape, and materials as well as in the details of the illustrated construction may be made without departing from the spirit of the invention.

I claim:

1. An integrated boat-trailer apparatus movable on land and on water, comprising:
   a. vessel means for floating the apparatus when the apparatus is in a body of water;
   b. support arm means for supporting the apparatus when attached to the transporting vehicle;
   c. means for pivotally mounting said support arm means with said vessel means at a prow thereof;
   d. an upper pivot arm;
   e. means for movably mounting said upper pivot arm at an upper portion thereof with the prow of said vessel means;
   f. a lower pivot arm;
   g. means for movably mounting said lower pivot arm at an upper portion thereof with a lower portion of said upper pivot arm.
   h. means for movably mounting said lower pivot arm at a lower poriton thereof with said support arm means;
   i. means for moving said upper pivot arm with respect to the prow of said vessel means;
   j. said upper pivot arm and said lower pivot arm folding and unfolding with respect to each other about said means for movably mounting same in response to said means for moving, wherein said support arm means is moved between an extended position supporting said vessel means on land and a retracted position adjacent the prow of said vessel means when the apparatus is in water;
   k. channel member means for receiving said support arm means, said upper pivot arm, and said lower pivot arm adjacent the prow of said vessel means when said support arm means is in the retracted position; and
   l. spring means for holding said support arm means in the retracted position within said channel member means.

2. The structure of claim 1, further including:
support wheel means mounted with said support arm means for permitting movement of the apparatus when the apparatus is detached from the transporting vehicle.

3. The structure of claim 1, further including:
   a. retractable wheel means movable to and from an extended position for supporting the apparatus when the apparatus is on land;
   b. said vessel means having receiving wheel wells formed therein to receive said retractable wheel means when said wheel means is retracted from the extended position;
   c. piston means for moving said retractable wheel means to and from the extended position; and
   d. means for energizing said piston means to move said wheel means, wherein the apparatus may be easily and quickly moved into and out of the water.

4. The structure of claim 3, wherein:
said receiving wheel wells are formed in the underside of said vessel means wherein the maneuverability and handling of said vessel means in the water is not impaired.

5. The structure of claim 3, further including:
means for mounting said retractable wheel means in said receiving wheel wells above the water line of said vessel means when the apparatus is in the water, wherein rust and corrosion of said retractable wheel means is reduced.

6. The structure of claim 3, further including:
safety latch means for locking said retractable wheel means in the extended position.

7. The structure of claim 3, further including:
coil spring means for providing resilient support for said retractable wheel means in the extended position.

8. The structure of claim 3, further including:
   a. a first wheel support arm for supporting said retractable wheel means;
   b. a second wheel support arm for supporting said retractable wheel means;
   c. mounting bracket means attached in said wheel wells for mounting said wheel support arms in said wheel wells; and
   d. axle means extending between said wheel support arms for mounting said retractable wheel means between said wheel support arms.

* * * * *